United States Patent [19]

Göpfert et al.

[11] 3,950,097

[45] Apr. 13, 1976

[54] METHOD AND APPARATUS FOR CONTOUR MAPPING AND ORTHOPHOTO MAPPING

[75] Inventors: Wolfgang M. Göpfert; Alvin A. Read, both of Ames, Iowa

[73] Assignee: Iowa State University Research Foundation, Inc., Ames, Iowa

[22] Filed: Feb. 18, 1975

[21] Appl. No.: 550,222

[52] U.S. Cl. ............................. 356/2; 350/162 SF
[51] Int. Cl.² ...................................... G01C 11/08
[58] Field of Search .............. 250/558; 350/162 SF; 356/2, 71

[56] References Cited
UNITED STATES PATENTS

| | | | |
|---|---|---|---|
| 3,602,593 | 8/1971 | Krulikoski et al. | 356/2 |
| 3,603,682 | 9/1971 | Sheridon et al. | 356/2 |

OTHER PUBLICATIONS

Krulikoski et al. "Automatic Optical Profiling," Photogrammetric Engineering, Vol. XXXVII, No. 1, Jan. 1971 pp. 76–84.

*Primary Examiner*—Alfred E. Smith
*Assistant Examiner*—Richard A. Rosenberger
*Attorney, Agent, or Firm*—Ray E. Snyder

[57] ABSTRACT

This invention describes an analog system for the automation of the stereocompilation process and for producing contour maps and orthophoto maps. It employs a combination of coherent optical and electronic techniques for the correlation of stereophoto pairs and thus the computation of parallaxes in the photogrammetric sense, for the selection of specific parallaxes, and for the production of contour maps and orthophoto maps.

The system in a basic form reproduces perspective contours of the imagery, and in a more complete system corrects the perspective contours into orthographic contours and orthophoto-maps.

12 Claims, 7 Drawing Figures

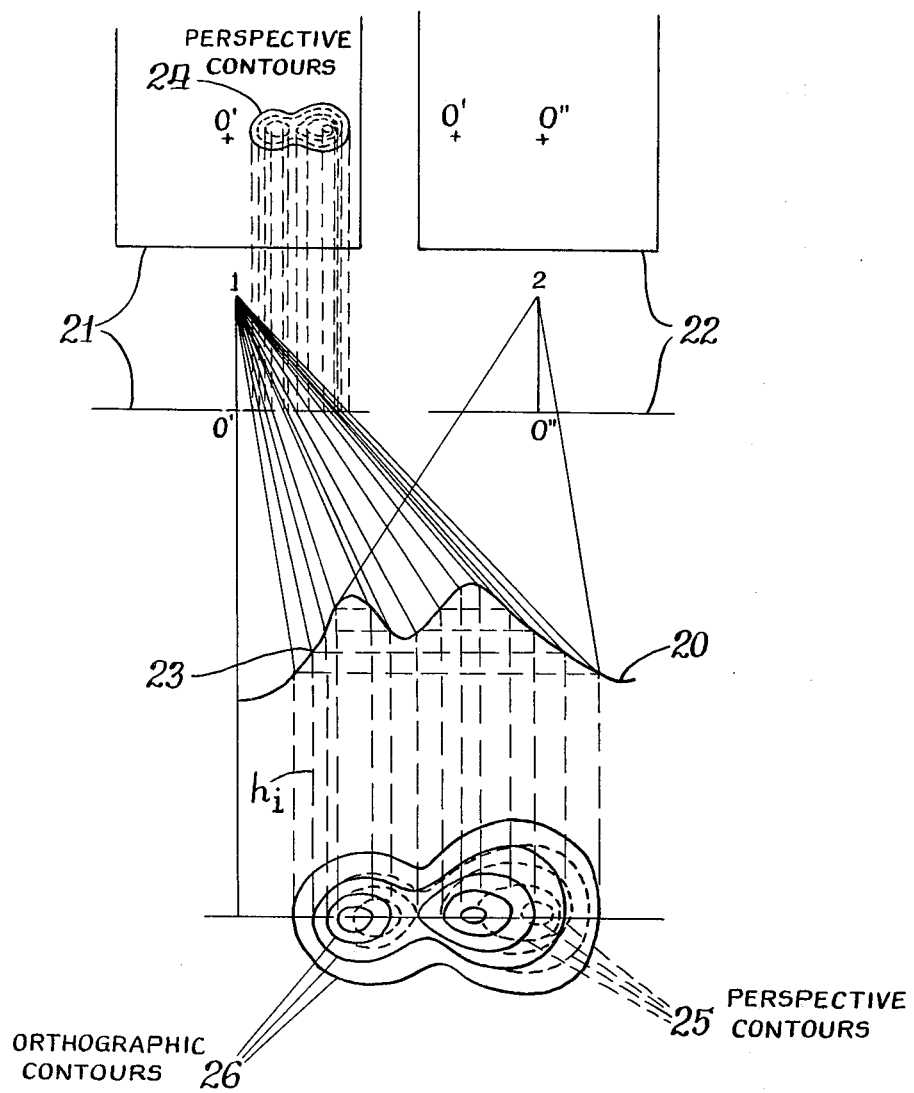

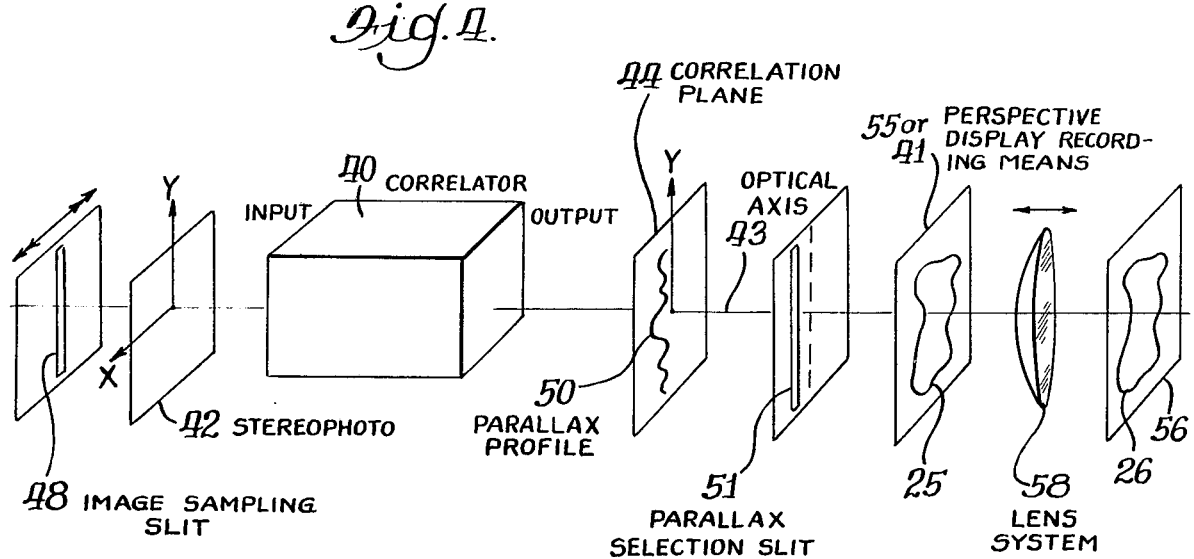
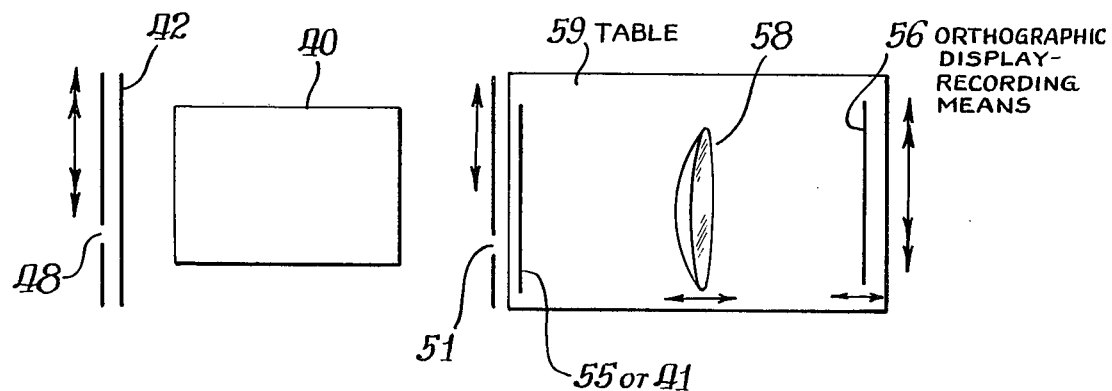

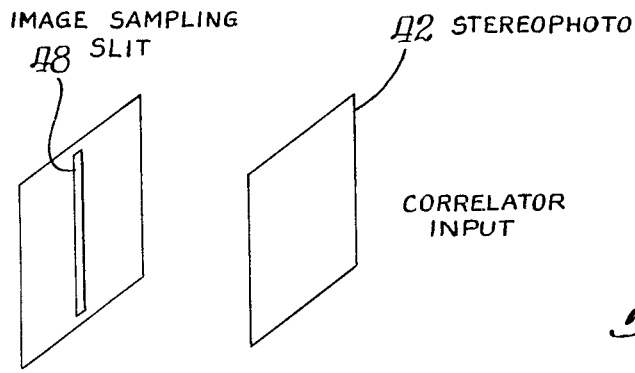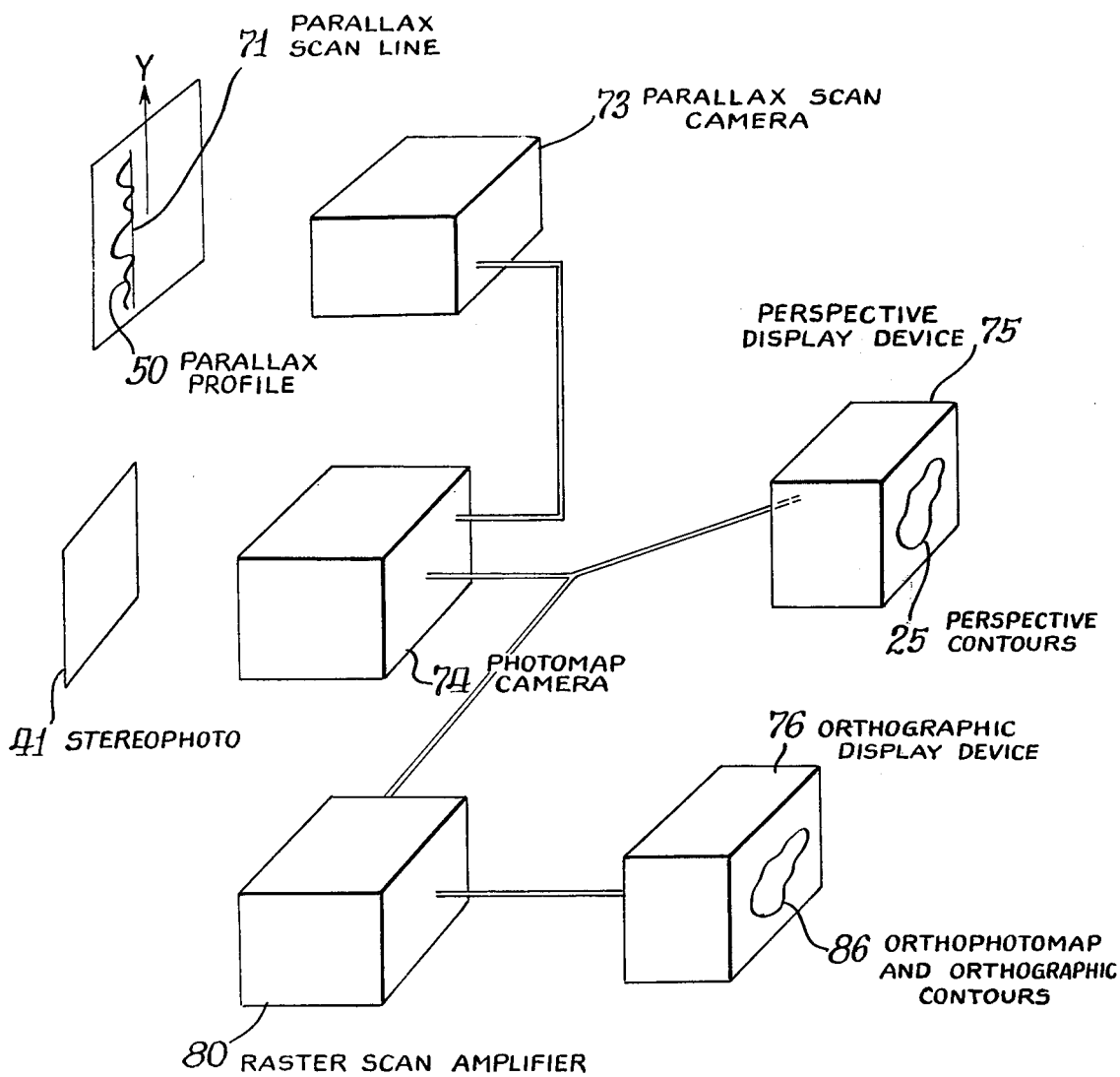
Fig.6.

METHOD AND APPARATUS FOR CONTOUR MAPPING AND ORTHOPHOTO MAPPING

BACKGROUND OF THE INVENTION

1. Field of the Invention

The invention relates generally to the field of Optics and Electro-optics, and more particularly to stereoscopic image analysis for the purpose of mapping. Still more particularly, it relates to optical and electronic systems for the automation of the stereocompilation process as applied to photogrammetric data reduction.

2. Description of the Prior Art

Electronic scanners and correlation by digital computers have been successfully employed for the automation of the stereocompilation process to perform automatic image-image matching of a stereopair of phototransparencies. Such equipment is elaborate and expensive for the function to be performed.

An alternate approach is the use of optical correlation via the spatial frequency domain for a part of the stereocompilation process. A system for performing this correlation function optically was described by Krulikoski et al. in a number of reports including "Automatic Optical Profiling," Photogrammetic Engineering 37 (No. 1 ), 76–84 (January 1971). Their system is described by the authors as a substantial step toward increasing the speed of an automatic stereocompilation process. Coherent optical multi-channel correlation techniques using Fourier transform holograms as spatial frequency filters were applied to the measurement of x-parallax in stereo photography. The output of their apparatus was produced as an "instant profile" in a correlation plane and displayed an entire x-parallax profile rather than parallaxes point-by-point sequentially. For any sampled y-directed strip of constant x in one of the stereotransparencies, the correlator output provided a simultaneous display of x-parallaxes as a function of the y-coordinate. All of the overlapping imagery was processed by sequentially moving a sampling slit aperture across the stereotransparency.

The further processing of the "instant profile" involved the digitizing of the profile-data, i.e. of x-parallax and corresponding x–y positions for all points of interest, digital computation of corresponding elevations, storage of the elevations of a large number of neighboring points, and then the interpolation between these elevations to draw a contour line at a specified elevation.

SUMMARY OF THE INVENTION

The present invention is directed to the further processing of the parallax-profile data by analog techniques by which the elevation contours are obtained directly. Although initially described in terms of a purely optical system, an electronic analog system is later described to perform the same function once the parallax-profile is determined.

It is an object of the present invention to provide a movable display or recording means disposed in the correlation plane and a parallax selection slit aperture disposed immediately in front of the display or recording means to provide perspective contours. The image sampling slit aperture and display-recording means are simultaneously movable transverse to the optical axis. The parallax selection slit is also incrementally movable transverse to the optical axis. All slits must be aligned parallel to the y-axis of the imagery and perpendicular to the optical axis of the system.

It is another object of the present invention to provide a scaling system behind the correlation plane effective to record directly orthographic contours and orthophoto maps. The scaling system includes a movable table on which are mounted a uniformly magnifying lens system and a display-recording means at the orthographic plane. The table is transversely movable with respect to the optical axis. In addition, the lens system and the display-recording means are independently movable on the table normal to the correlation plane to provide proper magnification between the perspective and orthographic display-recording planes.

The principal advantage of the present invention is an enormous increase in speed and cost-effectiveness over existing apparatus by the direct determination of elevation contours and their recording.

BRIEF DESCRIPTION OF THE DRAWINGS

FIG. 2 is a diagrammatic view of a terrain and superimposed perspective and orthographic projections of the terrain;

FIG. 4 is a diagrammatic, exploded perspective view of apparatus for optical stereocompilation;

FIG. 5 is a diagrammatic top view of the apparatus of FIG. 4; and

FIG. 6 is a block diagram of an electronic system analogous to the optical system of FIGS. 4 & 5.

DETAILED DESCRIPTION OF THE DRAWINGS

1. Photogrammetric Principles

Photogrammetry is the science of measuring data recorded on photographs and deriving reliable geometric parameters therefrom. The objects involved may be of any type of physical or biological structures. It is assumed the photographs are taken with the object being unchanged.

The widest application of photogrammetry has been in topographic mapping. The following text uses the semantics of topographic mapping although the applications of this invention are not limited to that activity.

1.1 PARALLAX-EQUATION

Figure 1:
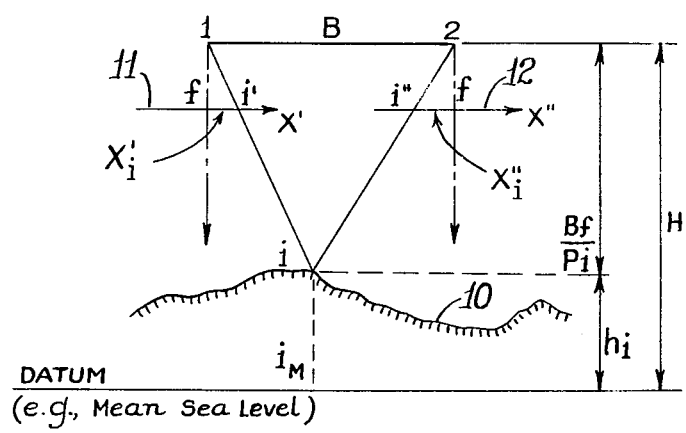
FIG. 1 is a diagrammatic side view of a terrain of variable elevation, illustrating some of the parameters defined herein.

The diagram of FIG. 1 serves to define some of the photogrammetric parameters and terminology used hereinafter, for a basic understanding of the present invention. Assume a cross-section of a terrain of variable elevation is designated by the numeral 10. All points i along the crest of the cross-section of terrain 10 lie at some vertical height $h_i$ above a reference datum plane $h_o$, which may be mean sea level as an example.

A view of the area of terrain 10 is photographed at an elevation H above the datum plane. Photographs are taken at points 1 and 2 which are separated by a horizontal baseline distance B. The planes of each photograph are parallel to the datum plane with the photographs taken through lenses of identical focal lengths $f$.

Figure 1A:
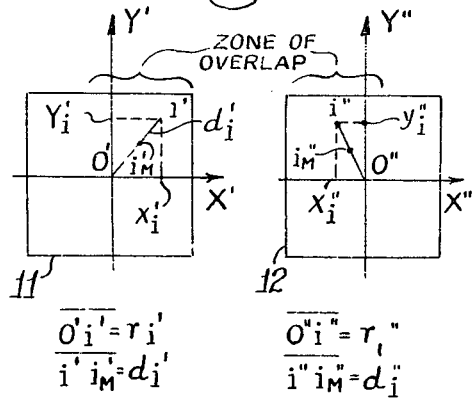
FIG. 1A is a top view of a stereo-pair of transparencies identifying a point i in FIG. 1.

A stereo-pair of photographs 11 and 12 of the terrain 10 are shown in FIG. 1A and identify images of a specific point $i$ as $i'$ and $i''$, respectively. The coordinates of $i'$ are $x'_i$ and $y'_i$, and of $i''$ are $x''_i$ and $y''_i$ where the origins of coordinates in both the single primed and double primed systems are taken at the point where the optical axis of the respective camera systems passes through the photograph. It is assumed the two axes are perpendicular to the datum plane. The apparent displacement in the direction of the x-axis of the point i in the two photos is then solely due to the parallax $p_i$ as long as the point i lies in the zone of overlap of the two photos 11 and 12.

The following relationships hold for all points i lying in the zone of overlap:

$$Y'_i = y''_i$$

$$x'_i - x''_i = p_i > 0$$

$$h_i = H - \frac{Bf}{p_i}$$

The measurement of parallaxes $p_i$ can be performed point-wise using, for example, a parallax-bar or a stereoplotter. These types of measurements are well known in the art and are relatively tedious and/or time consuming.

Parallax measurements can be performed very rapidly by the method taught by Krulikoski et al.

1.2 PERSPECTIVE AND ORTHOGRAPHIC PROJECTIONS

The diagrams of FIG. 2 serve to illustrate the difference between a perspective projection and an orthographic projection of an area of terrain 20. The area of terrain 20 is photographed from the points 1 and 2 to form a stereoscopic pair of photos 21 and 22. The top views of the photos 21 and 22 are shown in the upper part of FIG. 2. Imaginary contour lines 23 of elevations $h_i$ are drawn on the terrain 20 and would be represented in perspective view 24 as shown in photo 21.

An orthographic (i.e., truly vertical) projection of the contour lines 23 is shown beneath the terrain 20 in solid lines 26. The perspective projection of the perspective contour lines 24 represented in photo 21 is superimposed on the orthographic projection of contours 23 and is shown in continuous dotted lines 25. The perspective projection of the contour lines 24 has been enlarged so that a reference contour line at height $h_o$ is at the scale $S_o$ chosen for the orthographic contour map. The other superimposed dotted lines 25 correspond to different elevations $h_i$ of the terrain 20.

Two important observations are to be noted from the superimposed projections. First, the scale of the dotted perspective contour lines 25 increases from the bottom contour line to the top contour line, i.e., the scale $S_i$ of a contour of elevation $h_i$ is given by:

$$S_i = f/(H - h_i)$$

Secondly, each point on the closed dotted perspective contour line 25 has been displaced outward from the center $O'$ of the photograph by an amount $d'_i$. The relief displacement $d'_i$ for a point $i$ of elevation $h_i$ is given by the mathematical relationships:

$$d_i' = r_i' \left[ \frac{h_i - h_o}{H - h_o} \right]$$

and $$r'_i = \sqrt{x'^2_i + y'^2_i}$$

where $r'_i$ is the radial distance of a point $i'$ from the origin $O'$ of the photo coordinate system of photograph 11 which, as previously stated, is located on the optical axis of the imaging (and scaling) system.

A point i located at an elevation $h_i$ is projected to a plane of elevation $h_o$ by subtracting $d'_i$ from $r'_i$; that is, by scaling the radial distance $r'_i$ by:

$$C = \frac{r'_i - d'_i}{r'_i} = 1 - \left[ \frac{h_i - h_o}{H - h_o} \right] = \frac{H - h_i}{H - h_o}$$

Substituting the single primes in the equations above by double primes results in equations for the relief displacement $d''_i$ for point $i''$.

This means a perspective contour line 25 of scale $S_i = f/(H - h_i)$ can be changed into an orthographic (map) contour line 26 of chosen scale $S_o = f/(H - h_o)$ by imaging it through an optical system with magnification C.

The mathematical steps for reducing a perspective contour $h_i$ of scale $S_i$ into an orthographic contour $h_i$ of scale $S_o$ are:
1. Choose $S_o$. Then: $H - h_o = f/S_o$
2. Compute $C = (H - h_i)/(H - h_o) = BS_o/p_i$
3. Compute the object distance a and the image distance b in the imaging scaling system such that:

$$b/a = C \text{ and } 1/f_L = 1/a + 1/b$$

$$C = b/a \text{ and } 1/f_L = 1/a + 1/b$$

where $f_L$ denotes the focal length of the lens system used.

1.3 STEREO-PHOTO STRIPS

Figure 3:
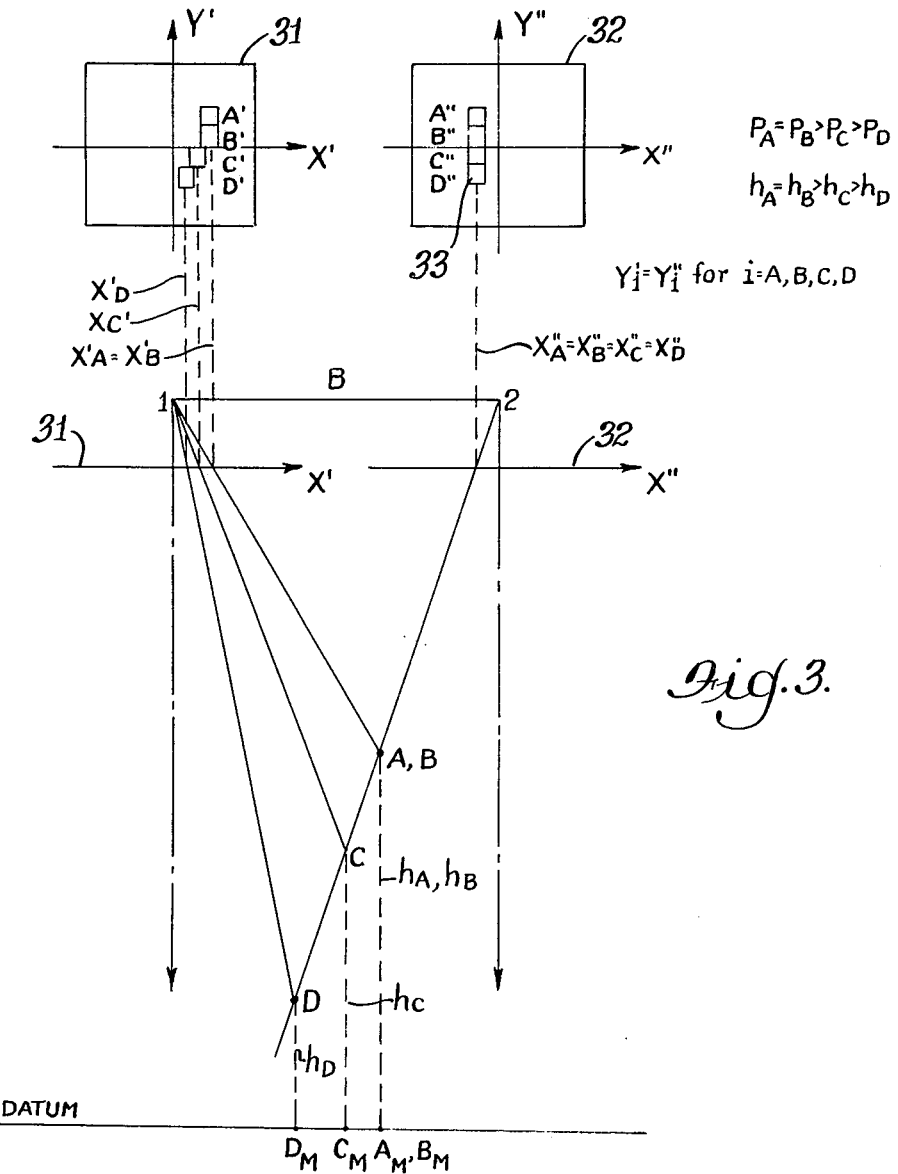
FIG. 3 is a diagrammatic view of points of different elevations and a stereo-pair of strip photos of the points.

The principles set forth in the preceeding sections can be applied to the analysis of stereoscopic photo strips as is illustrated in FIG. 3. This figure identifies small areas or points A, B, C, and D of elevations $h_A = h_B > 0$ $h_C > h_D$, respectively. A stereo-pair of photos 31 and 32 reproduce images of the small areas so identified.

The photo strip 33 that appears in photo 32 has an incremental width and an abscissa $x'' = $ constant for all of the images A'', B'', C'', and D''. In both photos 31 and 32, the ordinate $y'_i = y''_i$ for each image of $i = $ A, B, C, D.

As observed in photo 31, the parallaxes $p_i$ due to relief displacements of A, B, C, and D give $p_A = p_B > p_C > p_D$. Negative (or zero) parallaxes can never occur.

In addition, the scales for the respective points A, B, C, and D are not the same, i.e., $S_A = S_B > S_C > S_D$.

Although the images A'', B'', C'', and D'' fall on a straight line in photo 32, i.e., $x''_A = x''_B = x''_C = x''_D$, the orthographic (map) positions $A_M$, $B_M$, $C_M$, and $D_M$ of the image points do not fall on a straight line due to relief displacements.

In order to obtain a map of scale $S_o$ from a photo, it is necessary to eliminate for each image point the relief displacement and the scale variation present, both of which are caused by the fact that $h_i \neq h_o$.

The important observation to made of this treatment of the stereophoto strips is the y-coordinates of any arbitrary point are equal in the two photographs 31 and 32, and that the ground elevation data are contained in the difference in the x-coordinates, i.e. $p_i$. This equality of the y-coordinates satisfies the primary criterion for multichannel parallel processing to obtain x-parallax. This, in turn, establishes a basis for the operation of the optical parallax correlator.

2. CORRELATION - PARALLAX PROFILES

The mathematical principles of correlation are described to give a better comprehension of the meaning of the term "parallax profiles in the correlation plane" as used herein. The correlation of the images of stereophoto pairs can be greatly enhanced by the use of coherent optical principles in the method taught by Krulikoski. However, the exact method of implementation is not important for teaching the method described herein as long as the parallax profiles for all x-positions of the stereophoto pair can be obtained. The integral $$c(ⓐ) = \int_{-\infty}^{+\infty} t_1(x) \cdot t_2^*(x - ⓐ) \, dx$$

is a well known mathematical function called the correlation between signals $t_1$ and $t_2$. In general, $c$, $t_1$ and $t_2$ will be complex-valued functions. The asterisk used here and below indicates the quantity is the complex conjugate of the nonasterisked function. Although the integral is over all x-space, the signals $t_1$ and $t_2$ will be nonzero over only a limited range of space.

For purpose of explanation, first suppose $t_1$ and $t_2$ are the same signal but with $t_2$ shifted in position relative to $t_1$, i.e., let $t_2(x) = t_1(x + x_1)$. If $x_1$ is positive, then $t_2$ is simply $t_1$ shifted to the left or in the negative x-direction from $t_1$ itself. One can readily see the correlation c will be a maximum when the correlation axis coordinate ⓐ is of such a value that $$t_2(x - ⓐ) = t^*_1(x + x_1 - ⓐ)$$

exactly matches the position of the signal $t_1$, i.e., when ⓐ $= x_1$. If c above were to represent light intensity along the ⓐ-axis, then the point on the ⓐ-axis, viz., ⓐ $= x_1$, where the light intensity is a maximum gives the amount of shift the signal $t_2$ must be given to cause it to exactly match the position of signal $t_1$.

Next consider $t_2$ to be a long record that contains a replica of $t_1$ as a segment. Then the location of the maximum of c along the ⓐ-axis will indicate where in $t_2$ the replica record of $t_1$ is to be found relative to the position of $t_1$. If $t_1$ is regarded as a picture element in one stereophoto and $t_2$ a string of picture elements at the same y-coordinate in the second stereophoto, then the maximum of c will indicate the parallax between the two picture elements.

The interest here is in vertical stereophoto pairs in which picture elements have been translated in one stereophoto relative to another at a constant y-coordinate value. One can conceptually visualize the two stereophotos to be subdivided into a large number of parallel x-direction strips, each strip being a one-dimensional signal. Corresponding strips in the two stereophotos will contain the same picture elements but with a continual variation of parallax between equivalent piture elements in the two strips due to the elevation difference of the different picture elements along the strip.

When the image points of all parallel strips for a given x-coordinate position in one stereophoto are considered simultaneously with all image points of the corresponding strips in the other stereophoto, the result gives a distribution of parallax values for that x-position as a function of the y position, in other words a parallax profile corresponding to a given x-position. This parallel operation can be implemented optically by a coherent parallel multichannel one-dimensional correlator. It is obvious that changing the x-position will give rise to a new parallax profile on the correlation plane.

3. CONTOURS FROM THE PARALLAX PROFILES

The correlator for performing the correlation operations to give the parallax profiles is designated by the numeral 40 in FIGS. 4 & 5. Information (not shown) about the details of one of the stereophotos denoted 41 is stored within the apparatus 40 in an appropriate form. The other stereophoto 42 is located at the input side of the correlator 40. The parallax profile 50 is displayed at a correlation plane 44 at the output of the correlator 40. For the discussion herein a 1:1 magnification ratio is assumed to exist between the input and the correlator output. In practice, the correlation plane 44 will be ethereal and a parallax selection slit 51 is located in the correlation plane. This slit 51 is oriented parallel to the y-direction of the system as defined previously and movable transversely to the optical axis of the system 43. A similar slit 48, called the image sampling slit, is located immediately in front of the stereophoto input 42 and aligned in the y-direction. This slit 48 also is movable transversely to the optical axis 43.

For a fixed setting of the parallax selection slit 51, the image sampling slit 48 is moved transversely to the optical axis 43 across the entire range of overlap of the stereophotos 41 and 42. Whenever a parallax is encountered that matches the setting of the parallax selection slit 51, the parallax profile 50 will cross the slit 48. If a photosensitive medium 55 is placed on a movable table 59 directly behind the parallax selection slit 51 and the table moved in parallel and in 1:1 synchronism with the image sampling slit 48, a perspective contour 25 on a stereophoto 41 will be traced out on the photosensitive medium 55. Alternatively, instead of the photosensitive medium 55, a lens system 58 and another photosensitive medium 56 can be mounted on the table 59 such that they can be moved independently parallel to the optical axis 43 so as to focus the image of the parallax selection slit 51 onto the photosensitive medium 56 with a magnification $C = BS_o/p_i$ as described in Sec. 1.2. Then as the image sampling slit 48 and the table 59 are moved together as before, an orthographic contour 26 (as shown in FIG. 2) will be traced out on the photosensitive medium 56. After contours for a given parallax have been traced, the parallax selection slit 51 is set to a new value and the operation repeated for this new parallax. This procedure is repeated for all contours of interest. Thus by a purely analog means, perspective and orthographic contours can be generated from a pair of vertical stereophotos.

Orthophoto maps and orthophotos can also be generated in an analog fashion with such a system. A transparency of the input stereophoto 41 is properly placed on the movable table 59 immediately behind the parallax selection slit 51. The origin of the coordinate system of transparency 41, i.e. the principal point is centered on the x-axis of the system at a position corresponding to the parallax value of that point with its y-axis parallel to the parallax selection slit 51. As incrementally neighboring orthographic contours are traced out, projection of the corresponding image elements onto the photosensitive medium 56 by the parallax profile beam crossing the parallax selection slit 51 will produce a pictorial map of the terrain, with the pictorial information placed at the proper planimetric (map) positions. This pictorial map is commonly referred to as an orthophoto.

Extra exposures at selected discrete parallax settings, i.e. at selected elevations, with transparency 41 removed provides elevation contours simultaneously with properly positioned pictorial information. This map is referred to as an orthophotomap.

As an alternative procedure, each time the parallax selection slit 51 is incremented, the table 59 can be moved incrementally a like amount. The perspective contours 25 then will be perspective contours of stereophoto 42. For orthophoto or orthophoto maps, it is necessary to use a duplicate of stereophoto 42.

4. ELECTRONIC ANALOG OF THE CONTOURING PROCESS

Once the correlator 40 can generate parallax profiles, an electronic analog of the optical system described above can be implemented. One such implementation is illustrated in block diagram form in FIG. 6. As discussed in Section 3, an image sampling slit 48 or its electronic equivalent is assumed to pass in front of the stereophoto 42. A television type parallax scan camera 73 scans only along a y-direction scan line 71 corresponding to the position of the parallax selection slit 51 in FIG. 4. The parallax scan camera 73 makes a great many scans for transit of the image sampling slit 48. A photomap camera 74 is focused on stereophoto 41. Its y-direction deflection is slaved to the y-position of the parallax scan camera 73. Its x-direction deflection is slaved to the sum of the instantaneous x-position of the image sampling slit 48 and the x-position of the selected parallax scan line 71. The sweep raster system of perspective display device 75 is slaved directly to the raster scan of photomap camera 74. The sweep raster system of orthographic display device 76 also is directly slaved to the raster scan of photomap camera 74. A variable gain system 80 provides an electronic means to achieve the equivalent of the variable optical magnification needed to correct from perspective to orthophoto map coordinates.

For a given parallax, whenever the scan of the parallax scan camera 73 crosses a parallax profile, the photomap camera 74 is gated on during the interval of crossing. The perspective contours on stereophoto 41 corresponding to the chosen parallax thus are displayed on the perspective display device 75 as the image sampling slit 48 moves through its range. The image elements at that elevation and positions are superimposed on these contours. Similarly, orthographic contours corresponding to that chosen parallax will be superimposed on the orthographic display device 76 with the image elements along the elevation contours, but in correct planimetric positions. If stereophoto 41 which is in front of photomap camera 74 is replaced by an illuminated screen or its internal electronic equivalent, only a contour display will be presented on the two display devices.

After one contour has been displayed, and recorded, as appropriate, the parallax scan camera can be set for a new parallax line and the routine repeated. If a good orthophoto is desired, it is obvious that the parallax scan must be small and contiguous. If an orthophoto map is desired one needs only to replace electronically the stereophoto 41 with the equivalent of an illuminated screen for desired contours. Automatic operation of such a system is readily achievable.

Since the system is open-loop, failure to recognize a correlation may result in blank spots in the maps but the system will not suffer a failure or stop. The alternative or supplemental electronic system also offers advantages over the purely optical system inasmuch as pulse shaping and variable gain techniques can readily be applied to compensate for weak and varying light levels at different points in the operation.

The above discussion represents one electronic analog of the optical system. The most obvious alternate implementation is to have the parallax scan camera 73 move the parallax scan line 71 in appropriate increments across the correlation plane and to display and/or record segments of the corresponding contours and/or photomaps. This can be accomplished for one position of the image sampling slit 48, which can then be incremented to a new position and the process repeated until the entire region of overlap in the two stereophotos 41 and 42 has been covered. Other implementations exist but all fall within the spirit of this invention.

It is to be understood that the invention is not to be considered as limited to the embodiments shown and described, except in-os-far-as the claims may be so limited.

We claim:

1. An optical parallax correlation system having an optical axis and using coherent light, Fourier transforming lenses, and holographic recording to correlate images of stereophoto transparencies and to reproduce indicia of image element relative positions in a correlation plane, the improvement comprising:
   means defining a sampling slit aperture disposed in front of a transparency and mounted for transverse movement with respect to the optical axis;
   display-recording means disposed at the correlation plane and also mounted for movement transverse to the optical axis; and
   means defining a parallax selection slit aperture mounted in front of said display-recording means and also mounted for movement transverse to the optical axis.

2. The system of claim 1 in which:
   said sampling slit aperture and said display-recording means are movable simultaneously with respect to the optical axis while said parallax slit is kept fixed.

3. The system of claim 2 in which:
   said parallax slit and said display-recording means are movable simultaneously with respect to the optical axis while said sampling slit is kept fixed.

4. The system of claim 1 including:
   drive means connected to said sampling slit aperture, to said display-recording means and to said parallax selection slit aperture for producing incremental motion thereof transverse to the optical axis.

5. An optical parallax correlation system having an optical axis and using coherent light, Fourier transforming lenses, and holographic recording to correlate images of stereophoto transparencies and to reproduce indicia of image element relative positions in a correlation plane, the improvement comprising:

means defining a sampling slit aperture disposed in front of a transparency and mounted for transverse movement with respect to the optical axis;

an image scaling system disposed at the correlation plane and also mounted for movement transverse to the optical axis; and means defining a parallax selection slit aperture mounted in front of said image scaling system and also mounted for movement transverse to the optical axis.

6. The system of claim 5 wherein:
said image scaling system comprises:
a lens system;
a display-recording medium; and
carriage means carrying said lens system and said display-recording medium.

7. The system of claim 6 including:
drive means connected to said lens system and carried by said carriage means and adapted to move said lens system longitudinally with respect to the optical axis.

8. The system of claim 7 including:
additional drive means connected to said parallax selection slit aperture and adapted to move said aperture longitudinally with respect to the optical axis for correcting for changes in scale of images appearing on said stereophoto transparency.

9. An optical contouring system having an optical axis and used for processing a sequence of individual parallax profiles displayed on a plane normal to the optical axis and comprising:

means for sequential positioning of the individual parallax profiles;

means for illuminating the parallax profiles when positioned;

means defining a parallax selection slit aperture disposed in the parallax plane and moveable transversely to the optical axis and parallel to the parallax plane; and display-recording means disposed in the parallax profile plane immediately behind the parallax selection slit and the parallax profile position.

10. The optical contouring system of claim 9 including:

an image scaling system mounted for movement transverse to the optical axis and disposed behind said parallax selection slit.

11. An electro-optical system having an optical axis and used for processing a sequence of individual parallax profiles displayed on a plane disposed normal to the optical axis and comprising:

means for sequential positioning of the individual parallax profiles;

means for illuminating the individual profiles when positioned;

electronic camera means focused onto the parallax profile plane and operable for parallax selection; and display-recording means coupled to said electronic camera means for the display-recording of perspective contours and perspective maps.

12. The electro-optical system of claim 11 including:
controllable gain raster amplifier means coupled between said electronic camera means and said display-recording means whereby the display-recording of orthocontours and orthomaps is obtained.

* * * * *